United States Patent Office 3,770,653
Patented Nov. 6, 1973

3,770,653
NEMATIC LIQUID CRYSTAL COMPOSITIONS
Yoshio Katagira and Yoshio Miyata, Sendai, Japan, assignors to Kabushiki Kaisha Daini Seikosha and Kabushiki Kaisha Hattori Tokeiten, both of Tokyo, Japan
No Drawing. Filed Apr. 9, 1971, Ser. No. 132,816
Claims priority, application Japan, Apr. 17, 1970, 45/32,386
Int. Cl. C07c 69/00; C09k 3/00
U.S. Cl. 252—408   5 Claims

ABSTRACT OF THE DISCLOSURE

Nematic liquid crystal compositions having a liquid crystal range including ambient temperature are disclosed. The compositions include at least one compound having the general chemical formula

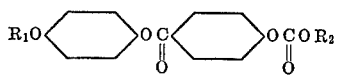

wherein $R_1$ and $R_2$ are alkyl groups such as $H(CH_2)_n$, and at least one compound having the general chemical formula

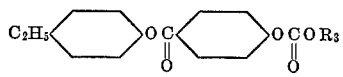

wherein $R_3$ is alkyl group such as $H(CH_2)_n$.

BACKGROUND OF THE INVENTION

Liquid crystals, discovered in 1888, are fluid within a given temperature range; below this temperature range the material is an anisotropic crystal. Compounds which exhibit the liquid crystal state over a temperature range are called thermotropic liquid crystals. An example is the well-known nematic liquid crystal p-azoxyanisole; it is a solid crystal below 117° C., and in the temperature range, 117–134° C. is a nematic liquid crystal. Above 134° C. it becomes liquid.

It has been proposed to use nematic liquid crystals in digital display devices since such materials scatter light when an electric field is imposed. However, the temperature range of most of the organic liquid crystals already known is substantially higher than ambient. An example is the familiar crystal anisylidene p-aminophenyl acetate, which has its mesomorphic temperature range at 83–110° C. and p-azoxyanisole which has its mesomorphic temperature range at 117–134° C. A number of other organic compounds have also been reported as nematic liquid crystals in references such as Landort-Bornstein, 1960, volume II, part 2a, page 266 but in all cases the mesomorphic temperature range is so high that the use of these liquid crystals in digital devices would be very difficult.

As is well known, when two compounds are mixed the melting point is lowered; moreover, the melting point is broadened into a melting range. This lowering of the mesomorphic temperature range on mixing of nematic liquid crystal compounds has been observed but the ranges have been too high to be useful in digital display devices. To be useful, it is necessary that the mesomorphic temperature range be near room temperature.

SUMMARY OF THE INVENTION

Compositions are disclosed which have a mesomorphic temperature range close to or including room temperature. These compositions include at least one compound of the type,

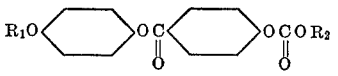

wherein $R_1$ and $R_2$ are alkyl groups having the general formula $H(CH_2)_n$ and, a compound of the type,

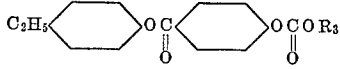

wherein $R_3$ is an alkyl group of the general formula $H(CH_2)_n$.

The two types of compounds are strongly soluble in each other, making it possible to prepare compositions having the desired mesomorphic temperature range. Moreover the compounds of the present invention are almost colorless and are transparent, making them highly suitable for use in digital devices.

Accordingly, an object of the present invention is to provide stable nematic liquid crystal compositions having a temperature range close to or including room temperature where such compositions are suitable for use in digital display devices.

A further object of the present invention is to provide nematic liquid crystals suitable for use in digital display devices where such nematic liquid crystals are easily prepared from readily available materials so that the final product is low in cost and economical for use.

Still other objects and advantages of the invention will in part be obvious and will in part be apparent from the specification.

The invention accordingly comprises a composition of matter possessing the characteristics, properties, and the relation of constituents which will be exemplified in the composition hereinafter described, and the scope of the invention will be indicated in the claims.

PREFERRED EMBODIMENTS OF THE INVENTION

The way in which compounds in accordance with the present invention are prepared is exemplified by synthesis of

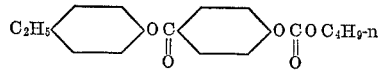

which is prepared as follows:

p-Hydroxybenzoic acid (1 mole) was dissolved in one litre of 2 M aqueous sodium hydroxide. To this mixture was added normal butyl chloroformate in slight excess under vigorous agitation at room temperature. The mixture was then acidified with acetic acid. Benzoic acid p-n-butyl carbonate was separated off, washed and dried. Thionyl chloride (1.2 moles) was added to the solid. After reaction the excess thionyl chloride was eliminated. After cooling, p-ethylphenol (1 mole) and pyridine (1 mole) were added. The mixture was poured into one litre of water and the solid ester was recrystalized from ethyl alcohol.

Examples in accordance with the present invention suitable for use as described above are as follows:

EXAMPLE 1

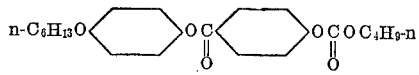

having a measured nematic mesomorphic temperature range of 38–75° C., in combination with

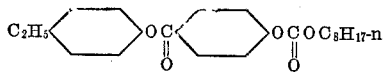

having a measured nematic mesomorphic temperature range of 34–40° C., at a mole ratio of 1:1. The product was a transparent nematic liquid crystal stable at 9–52° C.

The product was displaced between Nesa glass slides and subjected to a direct current electric field of $10^4$ v./cm. Strong light scattering was observed.

EXAMPLE 2

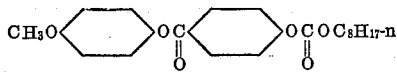

having a mesomorphic range of 37–65° C., in combination with

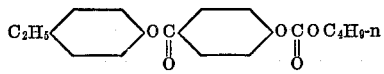

having a mesomorphic temperature range of 39–42° C. at a mole ratio of 2:1. The nematic liquid crystal product was stable at 12–56° C.

When tested as described in Example 1 strong light scattering was seen.

EXAMPLE 3

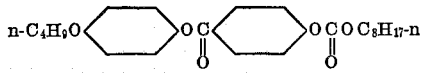

having a mesomorphic temperature range of 35–59° C., in combination with

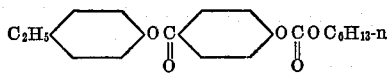

having a mesomorphic temperature range of 48–50° C. at a mole ratio of 1:1. The nematic liquid crystal product was stable at 13–54° C.

Strong light scattering again was observed when the product was tested as in Example 1.

EXAMPLE 4

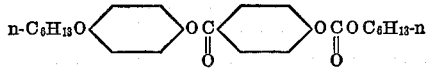

having a mesomorphic temperature range of 42–70° C., in combination with

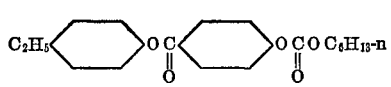

having a mesomorphic temperature range of 34–40° C. at a mole ratio of 1:2. The nematic liquid crystal product was stable at 7–50° C.

Strong light scattering was observed when tested as in Example 1.

Choice of a specific composition in a specific mole ratio will depend upon the particular application under consideration. The data needed for making a choice can be obtained by the standard techniques of preparing phase diagrams which need not be described here. The invention, therefore, is not to be considered as limited to the specific compositions given or to the specific mole ratios described.

It is also to be understood that the following claims are intended to cover all of the generic and specific features of the invention herein described, and all statements of the scope of the invention which, as a matter of language, might be said to fall therebetween.

What is claimed is:

1. A nematic liquid crystal composition, comprising 20 to 80 mole percent of at least one compound having a first general chemical formula

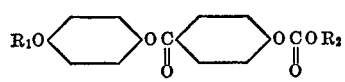

wherein $R_1$ is a saturated alkyl group having 1 to 8 carbon atoms and $R_2$ is a saturated alkyl group having 3 to 10 carbon atoms, and 20 to 80 mole percent of at least one compound having a second general chemical formula

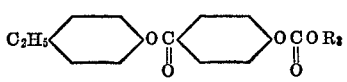

wherein $R_3$ is a saturated alkyl group having 3 to 10 carbon atoms, said composition being in the mesomorphic state at room temperature.

2. A composition as defined in claim 1, wherein said compound having said first general chemical formula is

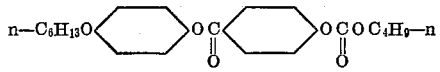

and said compound having said second general chemical formula is

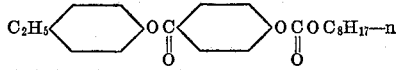

3. A composition as defined in claim 1, wherein said compound having said first general chemical formula is

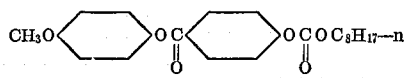

and said compound having said second general chemical formula is

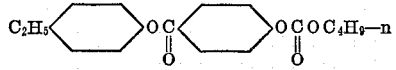

4. A composition as defined in claim 1, wherein said compound having said first general chemical formula is

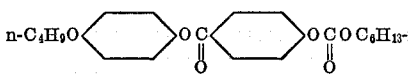

and said compound having said second general chemical formula is

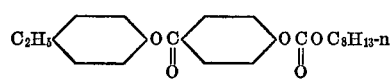

5. A composition as defined in claim 1, wherein said compound having said first general chemical formula is

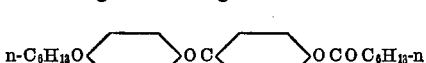

and said compound having said second general chemical formula is

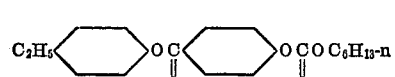

References Cited

UNITED STATES PATENTS 3,675,987   7/1972   Rafuse ------------ 350—160

FOREIGN PATENTS 1,170,486   11/1969   Great Britain.

OTHER REFERENCES

V. A. Usol' Tseva et al., Chemical Characteristics, Structure and Properties of Liquid Crystals—Russian Chem. Rev., vol. 32, No. 9, pp. 495–507 (September 1963).

Liquid Crystals Draw Intense Interest—C&EN pp. 20–23, Nov. 1, 1971.

GEORGE F. LESMES, Primary Examiner

M. B. WITTENBERG, Assistant Examiner

U.S. Cl. X.R.

23—230 LC; 260—463; 350—160 LC